(12) United States Patent
Bebee et al.

(10) Patent No.: US 11,200,032 B2
(45) Date of Patent: Dec. 14, 2021

(54) ACCELERATION TECHNIQUES FOR GRAPH ANALYSIS PROGRAMS

(71) Applicant: Amazon Technologies, Inc., Seattle, WA (US)

(72) Inventors: Bradley R. Bebee, Washington, DC (US); Bryan B. Thompson, Greensboro, NC (US); Thomas James Lewis, Washington, DC (US); Olaf Hartig, Bremen (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/563,695

(22) Filed: Sep. 6, 2019

(65) Prior Publication Data

US 2019/0391791 A1 Dec. 26, 2019

Related U.S. Application Data

(63) Continuation of application No. 15/354,981, filed on Nov. 17, 2016, now Pat. No. 10,409,560.

(60) Provisional application No. 62/256,893, filed on Nov. 18, 2015.

(51) Int. Cl.
*G06F 8/30* (2018.01)
*G06F 8/71* (2018.01)

(52) U.S. Cl.
CPC .............. *G06F 8/311* (2013.01); *G06F 8/71* (2013.01)

(58) Field of Classification Search
CPC ................................. G06F 8/311; G06F 8/71
See application file for complete search history.

(56) References Cited

U.S. PATENT DOCUMENTS

| | | | | |
|---|---|---|---|---|
| 7,143,412 B2 * | 11/2006 | Koenen | ................. | G06F 9/5044 718/102 |
| 8,037,474 B2 * | 10/2011 | Bates | .................... | G06F 9/5027 718/102 |
| 8,387,005 B1 * | 2/2013 | Ghosh-Roy | ............... | G06F 8/34 717/109 |
| 8,922,559 B2 * | 12/2014 | Charles | ................ | G06K 9/6224 345/440 |
| 9,195,445 B1 | 11/2015 | Shakeri et al. | | |
| 9,420,027 B1 | 8/2016 | Elsner | | |
| 9,501,304 B1 | 11/2016 | Powers et al. | | |
| 9,678,726 B1 * | 6/2017 | Massaguer | ................ | G06F 8/35 |
| 9,720,732 B1 * | 8/2017 | Shih | ......................... | G06F 9/50 |
| 10,552,774 B2 * | 2/2020 | Shih | ................. | G06Q 10/06315 |
| 2003/0061600 A1 * | 3/2003 | Bates | ................... | G06F 11/3664 717/133 |

(Continued)

OTHER PUBLICATIONS

SYSTAP, "The bigdata RDF Database", Technical Whitepaper, SYSTAP, LLC, May 29, 2013, pp. 1-25.

(Continued)

*Primary Examiner* — Douglas M Slachta
(74) *Attorney, Agent, or Firm* — Robert C. Kowert; Kowert, Hood, Munyon, Rankin & Goetzel, P.C.

(57) ABSTRACT

Source code of a graph analysis program expressed in a platform-independent language which supports linear algebra primitives is obtained. An executable version of the program is generated, which includes an invocation of a function of a parallel programming library optimized for a particular hardware platform. A result of executing the program is stored.

20 Claims, 9 Drawing Sheets

(56) References Cited

U.S. PATENT DOCUMENTS

| | | | |
|---|---|---|---|
| 2005/0071813 A1* | 3/2005 | Reimer | G06F 11/3604 717/125 |
| 2006/0143596 A1* | 6/2006 | Miyashita | G06F 8/433 717/131 |
| 2008/0301691 A1* | 12/2008 | Mamagkakis | G06F 8/00 718/104 |
| 2009/0319486 A1 | 2/2009 | Surlaker et al. | |
| 2009/0138862 A1 | 5/2009 | Tanabe et al. | |
| 2010/0005077 A1* | 1/2010 | Krishnamurthy | G06F 16/24542 707/E17.136 |
| 2010/0299657 A1 | 11/2010 | Barua et al. | |
| 2010/0325608 A1 | 12/2010 | Radigan | |
| 2011/0072309 A1* | 3/2011 | Sakai | G06F 11/362 714/35 |
| 2012/0084789 A1* | 4/2012 | Iorio | G06F 9/5066 718/105 |
| 2012/0096445 A1 | 4/2012 | Berg et al. | |
| 2012/0166772 A1* | 6/2012 | Ringseth | G06F 8/314 712/220 |
| 2013/0032937 A1 | 2/2013 | Lin | |
| 2013/0036409 A1* | 2/2013 | Auerbach | G06F 8/456 717/140 |
| 2014/0019949 A1* | 1/2014 | Craymer | G06F 8/456 717/150 |
| 2014/0019984 A1* | 1/2014 | Li | G06F 9/5027 718/102 |
| 2014/0109102 A1* | 4/2014 | Duncan | G06F 9/4881 718/103 |
| 2014/0114908 A1* | 4/2014 | Henrichs | G06F 16/283 707/602 |
| 2014/0189665 A1 | 7/2014 | Hong et al. | |
| 2015/0331803 A1* | 11/2015 | Heath | G06F 12/0895 711/125 |
| 2016/0092181 A1* | 3/2016 | Rodgers | G06F 8/447 717/145 |
| 2016/0188656 A1* | 6/2016 | Ekanadham | G06F 16/9024 707/755 |
| 2016/0314025 A1 | 10/2016 | McGarry et al. | |
| 2017/0024192 A1 | 1/2017 | Hong et al. | |
| 2017/0032487 A1* | 2/2017 | Ashari | G06T 1/20 |
| 2018/0300280 A1* | 10/2018 | Suzuki | G06F 16/27 |
| 2019/0384595 A1* | 12/2019 | Mills | G06Q 10/06 |

OTHER PUBLICATIONS

Wikipedia, "CUDA", Retrieved from URL: https://en.wikipedia.org/wiki/CUDA on Oct. 12, 2016, pp. 1-14.

Cyril Zeller, "NVIDIA Turtorial CUDA", Disponibile in rete: http://people.maths.ox.ac.uk/~gilesm/hpc/NVIDIA/NVIDIA_CUDA_Tutorial_No_NDA_ Apr08. pdf, 2008, pp. 1-50.

Mohammadtaghi Hajiaghayi, et al., "Hierarchical Graph Partitioning", Proceedings of the 26th ACM Symposium on Parallelism in Algorithms and Architectures, ACM, Jun. 2014, pp. 51-60.

Wikipedia, "OpenCL", Retrieved from URL: https://en.wikipedia.org/wiki/OpenCL on Nov. 10, 2016, pp. 1-16.

Sean Treichler, et al., "Realm: An Event-Based Low-Level Runtime for Distributed Memory Architectures", Proceedings of the 23rd International Conference on Parallel Architectures and Compilation, ACM, Aug. 2014, pp. 263-276.

Vijay Srinivas Agneeswaran, PhD, et al., "Paradigms for Realizing Machine Learning Algorithms", Big Data vol. 1 No. 4, Dec. 2013, pp. 207-214.

Zhisong Fu, et al., "Parallel Breadth First Search on GPU Clusters", In Big Data, 2014 IEEE International Conference, IEEE, Oct. 2014, pp. 110-118.

Huan Zhou, et al., "DART-MPI: An MPI-based Implementation of a PGAS Runtime System", Proceedings of the 8th International Conference on Partitioned Global Address Space Programming Models, ACM, 2014, pp. 1-11.

U.S. Appl. No. 15/587,313, filed May 4, 2017, Bradley R. Bebee, et al.

* cited by examiner

ACCELERATION TECHNIQUES FOR GRAPH ANALYSIS PROGRAMS

PRIORITY INFORMATION

This application is a continuation of U.S. patent application Ser. No. 15/354,981, filed Nov. 17, 2016, which claims benefit of priority of U.S. Provisional Application Ser. No. 62/256,893, filed Nov. 18, 2015, which are hereby incorporated by reference herein in their entirety.

BACKGROUND

Graph data structures comprising nodes and links are used to represent a wide variety of information for numerous types of computer-based applications. For example, applications associated with social networks, drug discovery, precision medicine, fault prediction in large distributed systems, cyber-defense, fraud detection, regulation compliance and the like may all employ graphs for representing respective sets of entities and relationships among the entities. Graph representations of complex dependencies are especially important for various types of machine learning algorithms, which are increasingly used in a number of problem domains. Developing scalable graph analysis applications which can handle a wide range of graph data sets may represent a non-trivial technical challenge.

Figure 1:
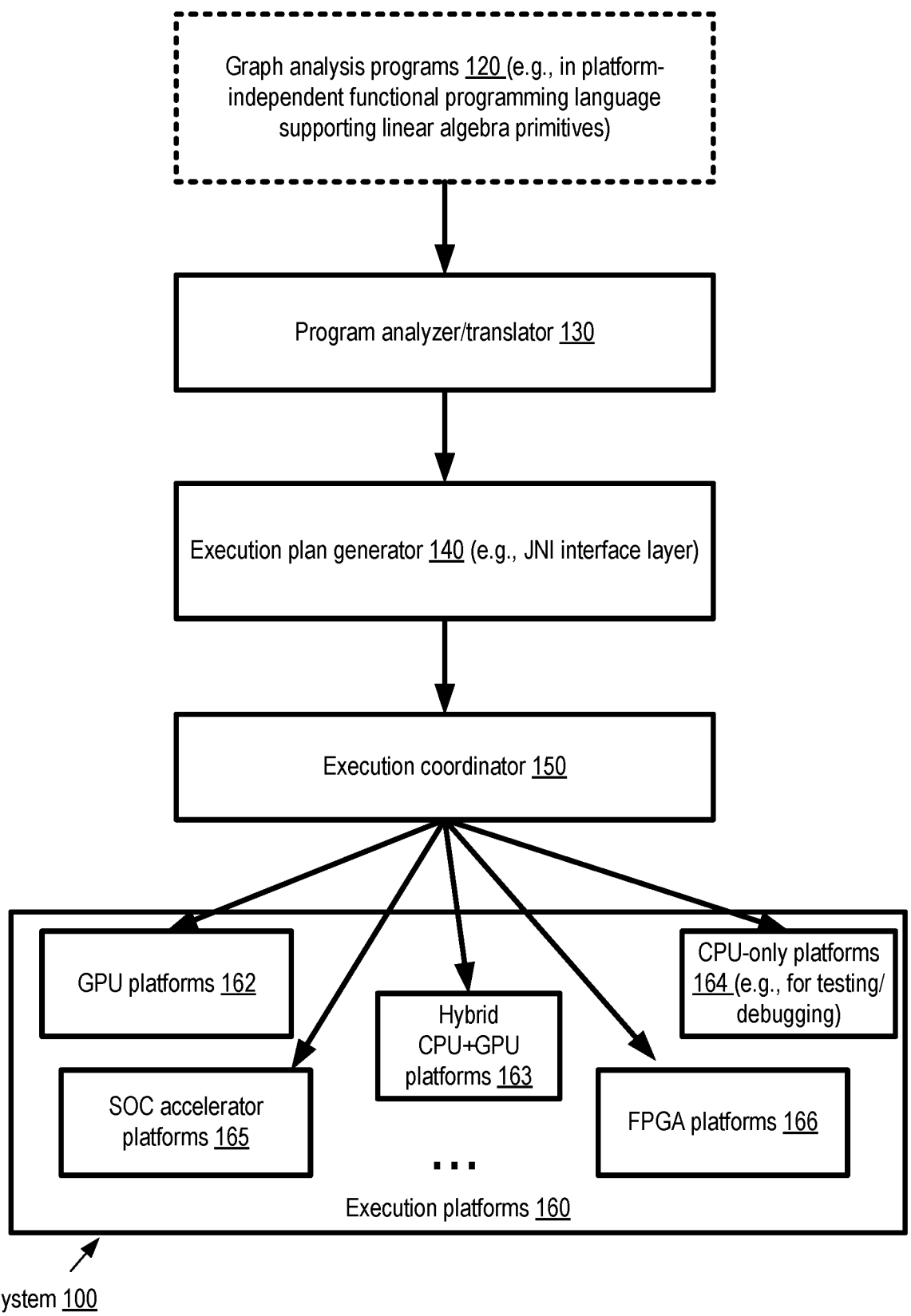
FIG. 1 illustrates an example system environment in which graph analysis algorithms, expressed in a high-level platform-independent programming language supporting linear algebra primitives, may be optimized for accelerated execution at a variety of hardware platforms, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of methods and apparatus for enabling acceleration and optimization of graph analysis algorithms at a variety of hardware platforms are described. According to some embodiments, a programmer may utilize a high level hardware-platform-independent programming language to produce the source code of a graph analysis program. A number of variants of programming languages may be used in different embodiments. In one embodiment, a domain-specific language comprising graph analysis extensions to a general purpose functional programming language such as Scala may be used. In another embodiment, a language supporting extensions to a graph traversal language such as Gremlin may be employed. The programming language used may enable programmers to express iterative graph analysis algorithms using various combinations or compositions of a set of linear algebra primitives in some embodiments. The source code for the graph analysis algorithm may be embedded or included within a program written in a different programming language (which may be called the "host" language) in some embodiments.

The programmer may submit source code (which may include a reference to one or more input graph data sets which are to be processed using the algorithm) to a graph program acceleration system (GPAS) in one embodiment for optimization and eventual execution. Various types of hardware platforms may be used in different embodiments for the execution of the algorithm indicated in the source code. In one embodiment, a platform may include one or more graphics processing units (GPUs). In another embodiment, the platform may include one or more conventional central processing unit (CPUs). A hybrid host or device which includes one or more GPUS and one or more CPUs may be used in one embodiment. A platform may include one or more FPGAs (field programmable gate arrays) in another embodiment. Accelerators implemented using system-on-chip (SOC) designs may be used in some embodiments. In one embodiment, a programmer may design and develop source code for the graph analysis algorithm in a programming language which does not require extensive expertise in parallel programming or detailed knowledge of the hardware platforms which might be used. The programming language used for the algorithms in such an embodiment may be referred to as a graphics program acceleration language or "GPALang" herein. The graph program acceleration system may be responsible in one embodiment for parsing and analyzing the source code, potentially transforming the source code into several types of intermediary data structures in multiple phases, searching for opportunities to optimize the algorithm in various platform-independent and platform-dependent ways, implementing some combination of optimizations (if any optimizations are found), optionally identifying the specific particular hardware platforms to be used, generating or selecting executable code modules tuned or optimized for the particular hardware platforms, executing the code at the hardware platforms, and providing the results of the execution to one or more destinations (e.g., to a submitter of the source code). In such an embodiment, the task of designing algorithms may be effectively separated from the task of executing the algorithms; programmers may be freed to focus on the logic of their algorithms, while the GPAS focuses on algorithm execution. Variants of this basic distribution of responsibilities may include, for example, embodiments in which the programmer or application owner selects the hardware platforms to be used and notifies the GPAS accordingly, or provides hints regarding specific types of optimizations which should be attempted. In some embodiments, the functions of the graph programming acceleration system may be implemented using one or more network-accessible services of a provider network as discussed below in further detail. The manner in which different functions of the graph program acceleration system are mapped to individual servers or hosts may vary in different embodiments. For example, in one embodiment, the analysis of the source code, the generation of the executable code, and the execution of the generated executable code, may all be performed on a single host (e.g., during testing of the graph analysis program). In another embodiment, respective sets of servers or hosts may be used for performing various phases of the analysis and optimization of the source code, and a cluster of nodes may be used to execute the program (e.g., in a production environment).

In one embodiment, a programmer may provide the source code for a graph analysis program, written in the platform-independent language GPALang, via a programmatic interface to the GPAS. A variety of programmatic interfaces may be used in different embodiments, such as a web-based console, a set of application programming interfaces (APIs), a command line tool, or a graphical user interface. The source code may be examined and parsed at the GPAS in one embodiment, and a corresponding abstract syntax tree (AST) may be generated. The nodes of the AST may comprise, for example, the linear algebra primitives used in the algorithm, user defined functions, assignment operators, variables to which values are being assigned, and the like. In some embodiments, the initial AST generated from the source code may be optimized at this stage, e.g., by combining or collapsing some nodes, re-arranging nodes, and so on. A dependency graph of tasks may be generated from the original or optimized AST in some embodiments. In one embodiment, each task of the dependency graph may correspond, for example, to an operator (such as matrix operators, vector operators, or matrix-vector operators) for which respective implementations of compute kernels, functions or routines tuned for different hardware platforms may be generated. Zero or more dependencies of a given task (e.g., a dependency on the output produced by another task) may also be indicated in the dependency graphs in one embodiment. The dependency graphs may be expressed in a hardware-platform-independent manner in at least some embodiments. In one embodiment, optimized versions of the dependency graphs may be generated, e.g., by dividing a given task into several smaller parallelizable tasks, etc.

In at least one embodiment, the dependency graphs may be passed on to an execution coordinator component of the GPAS. The execution coordinator may perform at least some hardware-platform-specific operations in some embodiments. For example, the tasks or nodes of the dependency graph may be analyzed, and corresponding compute kernels, functions or routines may be identified from a library. In some implementations, CUDA (Compute Unified Device Architecture) kernels may be used; in other embodiments, kernels compatible with a different parallel programming model may be used. If needed, the execution coordinator may generate executable code (e.g. for sequential portions of the program) specific to the hardware platform which is going to be used in one embodiment. In some embodiments, several different compute kernels may be available for a given operator, with individual ones of the kernels being optimized or tuned for respective hardware platforms. In one embodiment, a set of executable code modules prepared by the execution coordinator, which may include kernels with hardware-platform-specific optimizations, may be run at a selected hardware platform. In one embodiment, a distributed platform such as a multi-node cluster, with each node equipped with one or more CPUs and/or GPUs, may be used. In some embodiments, if a decision is made to use a multi-node execution platform, code modules for communication among the nodes may be generated by the execution coordinator and included within the executable representation of the graph analysis program. Any of a number of different approaches towards inter-node communication may be employed in various embodiments: e.g., communication primitives compatible with MPI (Message Passing Interface), Realm and/or PGAS (Partitioned Global Address Space) may be included in the executable modules generated by the execution coordinator. In one embodiment, the results obtained from the executable version of the program may be transmitted to one or more destinations (e.g., to a submitter of the program's source code) and/or stored at a selected storage device.

A number of different optimizations may be performed at one or more phases during the analysis of the source code and the preparation of the executable representation of the program in various embodiments. Such optimization operations, whose results are incorporated in the executable representation in such an embodiment, may in one embodiment include, among others, fusing a plurality of compute kernels into a single compute kernel, unrolling of a tail recursion, a sparsity-enhancement operation, a memory allocation operation intended for an overwrite-in-place data set, a selection of a compute kernel variant based on a read-only access pattern, or storing a data set into a shared memory accessible from a plurality of execution engines of the particular hardware platform. In one embodiment, one of the optimizations performed may comprise combining work items dynamically into a single kernel launch, e.g., based at least in part on utilization considerations. This latter optimization may be performed, for example, when the respective amounts of work corresponding to some tasks are small enough that inducing desired levels of utilization of the hardware platform being used may be difficult unless the tasks are combined. Such a "fiber bundling" approach may make it possible to retain high throughput in one embodiment even when the individual work items and/or associated data partitions are small.

The high-level programming language GPALang used to specify the graph analysis program may provide support for a number of different linear algebra primitives in various embodiments. For example, in one embodiment, the primitives may include an SpMV primitive (for sparse matrix vector multiplication), SpMM (for sparse matrix-matrix multiplication), a primitive to map a unary function over a vector, a primitive to map a binary function over two vectors, and/or a primitive implementing a convolution operation. Examples of source code which may be used to express graph analysis algorithms are provided below.

A wide variety of graph analysis algorithms may be accelerated using the techniques discussed above in various embodiments, including for example various types of tree search algorithms, hierarchical graph partitioning algorithms, graph coarsening algorithms, Louvain modularity algorithms, algorithms for determining a Jaccard similarity, triangle counting algorithms, collaborative filtering algorithms, matrix factorization algorithms, supervised neural network algorithms, clustering algorithms, or dimensionality reduction algorithms.

Example System Environment

FIG. 1 illustrates an example system environment in which graph analysis algorithms, expressed in a high-level platform-independent programming language supporting linear algebra primitives, may be optimized for accelerated execution at a variety of hardware platforms, according to at least some embodiments. As shown, graph program acceleration system 100 may comprise a program analyzer/translator 130, an execution plan generator 140, an execution coordinator 150, and a collection of one or more execution platforms 160 in the depicted embodiment. In some embodiments, respective sets of hardware and/or software components may be used for the program analyzer/translator 130, the execution plan generator 140 and the execution coordinator; as such, system 100 may comprise several layers, each comprising one or more components. In one embodiment, a single server may be used to implement the program analyzer/translator, the execution plan generator and the execution coordinator. In one embodiment, the program analyzer/translator 130 and the execution plan generator 140 may both be implemented within a single platform-agnostic virtual machine (e.g., a Java™ virtual machine), and "native" or platform-specific methods may be used to invoke the execution coordinator (e.g., using the Java™ Native Interface or JNI framework, or using a Python interpreter).

In one embodiment, source code of a variety of graph analysis programs 120, each utilizing or implementing one or more graph analysis algorithms, may be presented as input to the analyzer/translator 130. The programs 120 may be written in a hardware-platform-independent high level programming language designed specifically for graph algorithms in some embodiments; that is, a domain-specific language for graph algorithms may be used in such embodiments. The programming language may allow graph algorithms to be expressed as combinations or compositions of linear algebra primitives in one embodiment. In at least some embodiments, a functional programming language may be used, which results in code which typically does not have side effects. In other embodiments, the programming language need not necessarily be a functional language.

In one embodiment, the analyzer/translator layer 130 may examine and parse the source code and translate it into an abstract syntax tree (AST). The nodes of the AST may comprise, for example, program variables, assignment operators, linear algebra primitives of the programming language, or user-defined functions in one embodiment. In one embodiment, one or more opportunities for optimizing a program may be identified at the analyzer/translator layer 130, and an initial or baseline AST may be transformed into an optimized AST by, for example, coalescing nodes, rearranging nodes, and so on. In various embodiments, a user-defined function may comprise a routine which does not comprise a pre-defined primitive of the programming language. Compute kernels formatted according to one or more targeted parallel programming models (e.g., CUDA) may be generated in one embodiment for at least some user defined functions, e.g., by the execution coordinator.

In one embodiment, the AST, which may be represented in a hardware-platform-independent format, may be passed on to the execution plan generator layer 140. Using the AST, the execution plan generator may derive a task dependency graph in such an embodiment, whose nodes comprise schedulable tasks corresponding to various types of operators (including vector operators, matrix operators, matric-vector operators and the like) for which tuned compute kernels may be available for various types of hardware platforms to the execution coordinator 150. Dependencies among the tasks, such as the requirement that the output of one task be available before another task can be begun, may also be indicated in the dependency graph in one embodiment. The tasks identified in the dependency graph may also be represented in a platform-independent manner in one embodiment—e.g., the tasks may represent abstractions of the operators, for which platform-specific implementations may have to be identified, selected or generated by the execution coordinator 150.

The task dependency graphs may be transmitted to the execution coordinator 150 from the execution plan generator layer 140 in one embodiment. In one embodiment, the execution coordinator layer 150 may analyze the task and their dependencies, select compute kernels corresponding to the tasks, generate any sequential code which may be needed, and compile and link an executable representation of the program for a specific execution platform 160. A variety of hardware platforms may be used in different embodiments. In one embodiment, a platform 162 may comprise one or more GPUs. In another embodiment, a platform 164 comprising one or more CPUs and no GPUs may be used, e.g., for checking code correctness or debugging. A hybrid platform 163 comprising one or more CPUs and one or more GPUs may be used in one embodiment. Platforms containing one or more field programmable gate arrays (FPGAs) 166 may be used in one embodiment. A platform 165 which includes accelerators for various algorithms, which may be implemented using SOC (system-on-chip) architectures may be used in one embodiment. The hardware platform to be used may be selected in various ways in different embodiments. In some embodiments, for example, a pool of execution platforms with different characteristics may be available, and the execution coordinator may select the specific platforms or types of platforms to be used, and use kernels optimized or tuned for those platforms. In other embodiments, the submitter of the program may indicate preferences for the type of platform to be used.

Source Code Examples

Example source code corresponding to a breadth-first search algorithm which may be submitted by a programmer or developer in one embodiment is provided and discussed below. Breadth first search (BFS) is a commonly-used graph analysis technique, involving a traversal of the vertices in a graph beginning at a given source vertex. All of the vertices reachable from the source vertex are explored in the first iteration. In each successive iteration all vertices reachable from vertices newly reached in the previous iteration are explored. Iterations proceed until no unexplored nodes are reachable from vertices newly reached in the previous iteration. In one embodiment, source code for a breadth first search algorithm may be expressed in the following manner using a high-level platform-independent language supporting linear algebra primitives of the kind mentioned above:
Source Code Example SCE1:

```
1.  def BFS(frontier, graph, levels, visited, depth) {
2.      if (frontier.isEmpty) return(levels);
3.      val tmp = SPMV(graph.transpose, frontier);
4.      val mask = MAP((x) => if (x == -1) false else true, tmp /*x*/);
5.      val newLevels = MAP((x) => if (x == -1) depth else x, levels
        /*x*/, mask);
6.      val newVisited = MAP((x) => if (x == -1) false else true,
        visited, mask);
7.      val newFrontier = ZIP((x, y) => if (y) -1 else x, tmp,
        newVisited);
8.      return BFS(newFrontier, graph, newLevels, newVisited,
        depth+1);
9.  }
```

In example SCE1, line 1 declares the BFS function. The "graph" parameter is assumed to be a sparse matrix representing the input graph for which the search is to be conducted. The "frontier" parameter is a vector representing the frontier vertex set, which is the set of vertices first explored in the previous iteration. The frontier vector may be initialized to all zeroes except for the element corresponding to the starting vertex, which may be set to 1. The "levels" parameter is a vector which labels each vertex with the iteration it was first explored in, or −1 if the vertex hasn't yet been explored; initially, all elements of levels are set to −1, except for the starting vertex which is set to 0. The "visited" parameter is a vector whose elements indicate whether each of the vertices has already been visited or not. The "depth" parameter corresponds to the current iteration count of the search, initially set to 1.

Line 2 is a termination check for concluding the iterations of the search. Line 3 performs a 1-hop parallel expand, returning the vertices in the 1-hop neighborhood as a compact queue using the SPMV linear algebra primitive. Line 4 prepares a bitmask from the one-hop neighborhood. Line 5 uses the mask to assign the current depth to the vertices visited for the first time in the current iteration. Line 6 uses the mask to update the set of vertices visited for the first time in the current iteration. Line 7 computes the new frontier from the 1-hop neighborhood and the bitmap of vertices visited for the first time in the current iteration. Vertices in the 1-hop neighborhood that have already been visited are cleared from the frontier by setting the corresponding element of frontier to −1. Line 8 represents a tail recursion operation, in which the BFS function is invoked recursively.

In one embodiment, during the analysis and processing of the BFS source code by a graph program acceleration system, one or more optimization operations may be identified for a GPU-based platform. For example, lines 4, 5 and 6 may be fused into a single compute kernel. Rather than creating a bitmask (line 4) and passing that into the MAP kernels (lines 5 and 6), the MAP kernel may be applied on a compact queue (tmp, representing the 1-hop neighborhood). Further, the two MAP operations of lines 5 and 6 are over the same mask. Thus, the functions for these operations may be pushed down into the kernel and executed at the same time. The tail recursion of line 8 may be unrolled into a sequence of kernel invocations. An analysis of the data movement in the BFS code may reveal that the only data movements are the values passed into the first BFS invocation and the final result of the BFS traversal. When the tail recursion is unrolled, the system may recognize that none of the intermediate values are visible to the CPU. As a result, storage for the values may be allocated once and then destructively overwritten in each iteration. Sparsity of the data structures allocated on the GPU (e.g., the frontier and newFrontier data structures) may be maximized.

In some embodiments, depending on the source code of a given graph analysis program, kernel variants that are tuned for restricted communication patterns (e.g., when some set of accesses are read-only) may be selected, only subgraphs rather than the entire graph may be transmitted to a GPU, or shared memory accessible by multiple execution engines may be used for some of the graph data. The use of shared memory may, for example, enable improvements in effective memory bandwidth in one embodiment.

In one embodiment, a given instance of a graph analysis algorithm such as the BFS algorithm may be invoked in the following manner from a graph analysis program written for example in a language similar to Scala. In this example, the name of graph program acceleration system which can be used to run a BFS function similar to that shown above is assumed to be "GPASystem".
Source Code Example SCE2:

```
....
1.  val adjMatrix = readInputMatrix( );
2.  val srcVertexID = 0;
3.  var BFSworkerInstance = new BFSWorker(adjMatrix, srcVertexID);
4.  val result = GPASystem.run(BFSworkerInstance);
....
```

In line 1 of SCE2, the input graph data set is read in. In Line 2, the starting vertex identifier is initialized. An instance of BFSWorker, a wrapper program which runs the BFS algorithm similar to that shown in ESC1, is created in line 3. The instance of BFSWorker is passed to GPASystem for analysis, optimization and execution in line 4, and the result of the execution is returned. Other ways of invoking the graph may be used in other embodiments—e.g., a command line tool which takes a source code file containing the graph analysis algorithm as input and returns the results of the optimized execution of the program may be used in some embodiments. For example, the command "GPACLI <sourcefileName> <inputParameterList>" may be used from within a shell execution environment in one embodiment, in which GPACLI is the name of the command line tool, <sourceFileName> contains the graph analysis program, and <inputParameterList> includes zero or more parameter values such as the name of an input graph data file, hints regarding optimizations to be performed, and so on.

In various embodiments, source code elements of the language used in the graph program acceleration system may be embedded within programs written in various host languages, such as Scala, Gremlin and the like as mentioned earlier. The following is a Gremlin source code example which may be used for breadth-first search in one embodiment. The name "GPALang" is used to refer to the embedded programming language for which optimizations can be performed using a graph program acceleration system of the kind discussed in the context of FIG. 1.
Source Code Example SCE3:

```
1.  G.matrix( ).transpose( ).as('adjT');
2.  G.V( ).createVec{ x -> x == src ? 0 : -1 }.repeat{
3.      init{input.apply{x -> x + 1}.as('frontier')}.
```

-continued

```
4.     step{
5.         'frontier'.SPMV('adjT',
               SemiRing(GPALang.builtIns.Times,
                 GPALang.builtIns.Or)).
6.         applyPairwise(input, {(x,y) -> x == 1 && y == −1 ? 1 :
             0}).as('frontier')
7.     }.
8.     step{input.applyPairwise('frontier ', { (x,y) -> y == 1 ?
         loops( ) :
             x}).setOutput( )}.
9.     step{'frontier'.reduce(0, { (x,y) -> x + y }).as('frontierCount')}
10. }.until('frontierCount' == 0)
```

In SCE3, a constant "src" indicates the index of the starting vertex of the search. In line 1, a transpose of the adjacency matrix containing the input graph data set for which breadth-first search is to be conducted is obtained, using matrix( ) and transpose( ) functions of GPALang. In line 2, a vector (corresponding to the "levels" vector of SCE1 above) is initialized with all values except src set to −1, and the value for src set to 0. The "repeat" and "step" Gremlin constructs are used to perform the iterations of the search. The "init" Gremlin construct is used in line 3 to generate the "frontier" vector. In line 5, the GPALang SPMV primitive is invoked with a non-standard Semi-Ring which uses the GPALang built-in "Or" for addition. In line 6, previously-visited vertices are removed from the vertex set. In line 8, the equivalent of the "levels" vector is updated. Line 9 computes the iteration termination condition, performing a reduction to sum all the elements in the frontier vector. When the frontier is empty, the sum ("frontierCount") will be zero and the iterations will be terminated as per line 10.

Program Analysis and Optimization Phases

Figure 2:
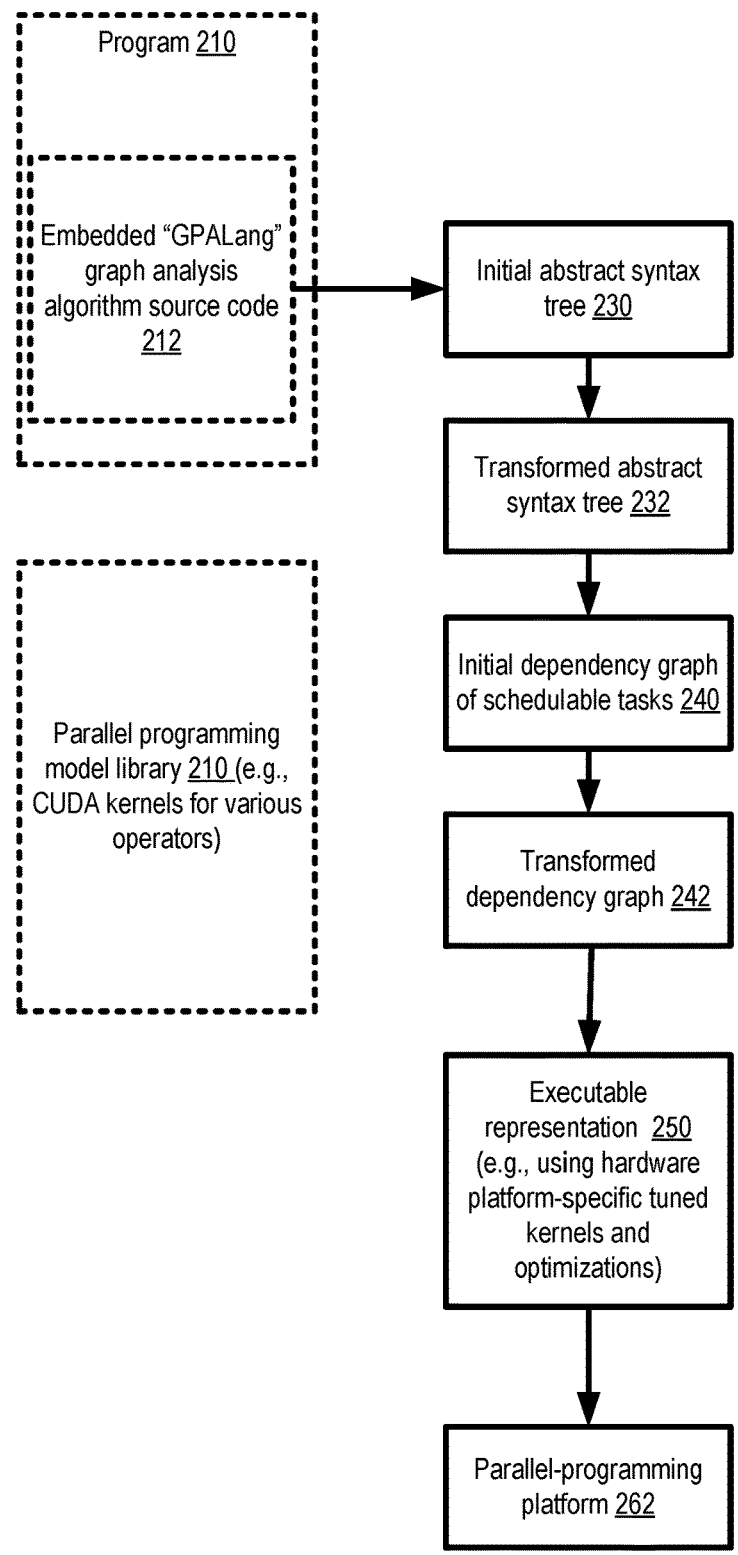
FIG. 2 illustrates examples of several stages of optimizations which may be performed on graph analysis algorithms, according to at least some embodiments.

FIG. 2 illustrates examples of several stages of optimizations which may be performed on graph analysis algorithms, according to at least some embodiments. As shown, in one embodiment a program 210 (which may be written in a host language such as Java™, Scala, Gremlin or the like) comprising embedded GPALang algorithm code 212 may be provided for analysis, optimization and execution to a graphics program acceleration system (GPAS). The program may be examined and parsed, e.g., at a translator layer of the GPAS, and an initial abstract syntax tree 230 may be produced in one embodiment. In various embodiments, the translator layer may identify various user-defined functions (i.e., functions in the source code for which compute kernels may not already be available), and kernels corresponding to such user-defined functions may be generated (e.g., at an execution coordinator). In some embodiments, opportunities for optimizing the abstract syntax tree may be identified, and a transformed syntax tree 232 may be derived from the initial abstract syntax tree.

The transformed syntax tree may be passed on to the execution plan generator layer of the GPAS, where an initial dependency graph 240 of schedulable tasks may be generated in the depicted embodiment. The tasks may be represented at an abstract level at this stage of the analysis, e.g., without referencing any specific hardware platforms. Depending on the dependencies identified among the tasks, several of the tasks may be parallelizable in some embodiments. The dependency graph may also indicate any necessary sequential steps in one embodiment. Individual tasks may correspond to any of a number of operators, such as vector operators, matrix operators and the like, for which compute kernels such as CUDA kernels may be available in a parallel programming model library 210 in one embodiment. In some embodiments, one or more optimizing transformations may be applied on the initial task dependency graph 240 to obtain a transformed dependency graph 242.

In one embodiment, the transformed dependency graph 242 may then be transmitted or provided to the execution coordinator, where a platform-specific executable representation 250 of the program may be generated. The executable representation may comprise various compute kernels that are optimized or tuned for a selected parallel processing platform—for example, several versions of a given kernel may be available, each tuned for a different GPU-based server or cluster, and the appropriate version may be selected for the platform which is going to be used. Respective kernels corresponding to one or more user defined functions may also be generated and incorporated into the executable representation in one embodiment. In addition, in one embodiment the execution coordinator may perform other optimizations on the task dependency graph, such as replacing one task with a number of smaller tasks which can potentially be performed in parallel, inserting the appropriate code hooks for communication among the nodes of a cluster to be used for parallel execution of the program, and so on. In one embodiment the executable representation may then be run at the selected parallel programming platform 262, and results of the execution may be stored or transmitted to one or more destinations.

As indicated in FIG. 2, optimizations may be identified and implemented at several different layers of the graph program acceleration system in various embodiments, such as the translator layer, the dependency graph generation layer, and the execution coordinator responsible. It is noted that for a given program or algorithm, optimizations need not necessarily be performed at one or more of the layers in various embodiments.

Figure 3:
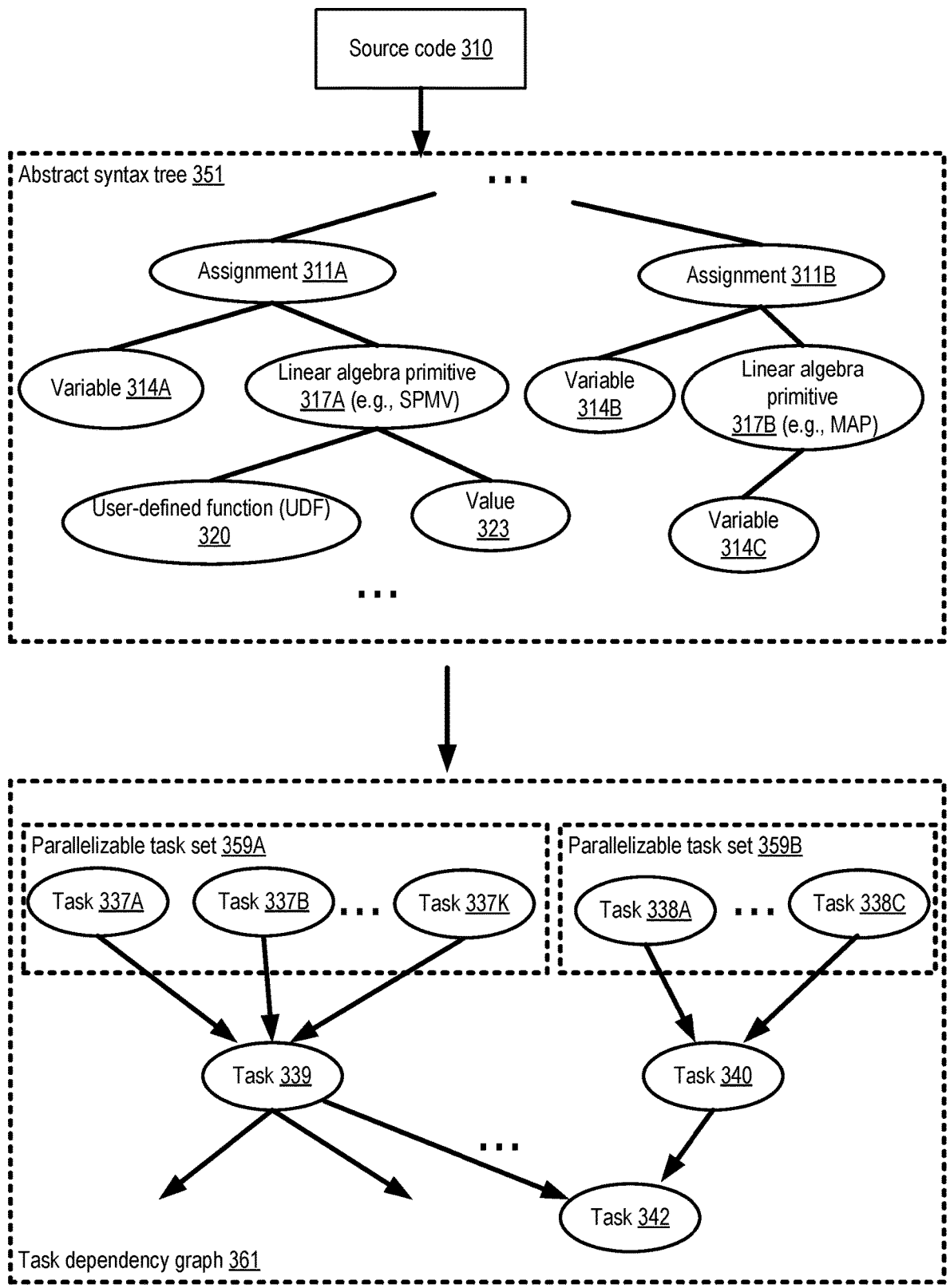
FIG. 3 illustrates examples of intermediary data structures which may be generated from a graph analysis program prior to its execution, according to at least some embodiments.

FIG. 3 illustrates examples of intermediary data structures which may be generated from a graph analysis program prior to its execution, according to at least some embodiments. In the depicted embodiment, source code 310 of the program may first be parsed and analyzed to produce an abstract syntax tree 351 representing the logic being implemented in the program. Nodes of the abstract syntax tree may include, among others, assignment operators (such as nodes 311A and 311B), linear algebra primitives (such as node 317A corresponding to an SPMV primitive and node 317B corresponding to the MAP primitive), user-defined functions (such as node 320), variables (such as nodes 314A-314C) and values (such as node 323) in some embodiments. Programmers may be permitted to register UDFs which include mathematical and logical operations expressed in the host programming language (the language in which the GPALang code is embedded) in various embodiments. For example, the following line of code may be used to register a UDF to compute the reciprocal of the out-degree of each vertex in a graph in one embodiment:

Source Code Example SCE4:

```
1.     val fct_RecipOutdegs =
           GPALangContext.functionRegistry.registerUnaryFunction(
             (outdeg: Float) => if (outdeg == 0F) outdeg else 1F /
               outdeg)
```

In an embodiment in which CUDA is used, the portions of the abstract syntax tree corresponding to UDFs may be converted into equivalent CUDA kernels by the translation layer. Only a subset of the functions and/or operators supported by the host language may be registered as UDFs in one embodiment. In some embodiments, only a selected subset of the data types available in the host language may be used for UDFs or passed as parameters to various linear algebra operators.

The abstract syntax tree may be used to generate a task dependency graph 361 in the depicted embodiment. Individual nodes of the dependency graph may represent separately schedulable tasks, with edges denoting data dependencies among the tasks (e.g., an edge leading from one task node 337K to another task node 339 may indicate that task 339 requires the output of task 337 to be available). At least some of the tasks may be parallelizable—e.g., tasks 337A-337K of task set 359A may all be run in parallel, and tasks 338A-338C of task set 359B may be run in parallel. In the depicted embodiment, individual ones of the tasks may represent an execution of an operator, such as a matrix operator, a vector operator, or a matrix-vector operator in various embodiments. In one embodiment, the task dependency graph 361 may be platform-independent, and may be sent to the execution coordinator layer by the execution plan generator layer of the GPAS as discussed above conversion to a hardware platform specific executable form. In some embodiments, persistent representations of the task dependency graph 361 and/or the abstract syntax tree 361 may be stored, e.g., to assist with debugging of the graph analysis program. As mentioned earlier, in various embodiments an initial abstract syntax tree and/or an initial task dependency graph may be transformed or optimized prior to being passed on to the next layer in the GPAS stack.

Intermingled Serial and Parallel Code Sections

Figure 4:
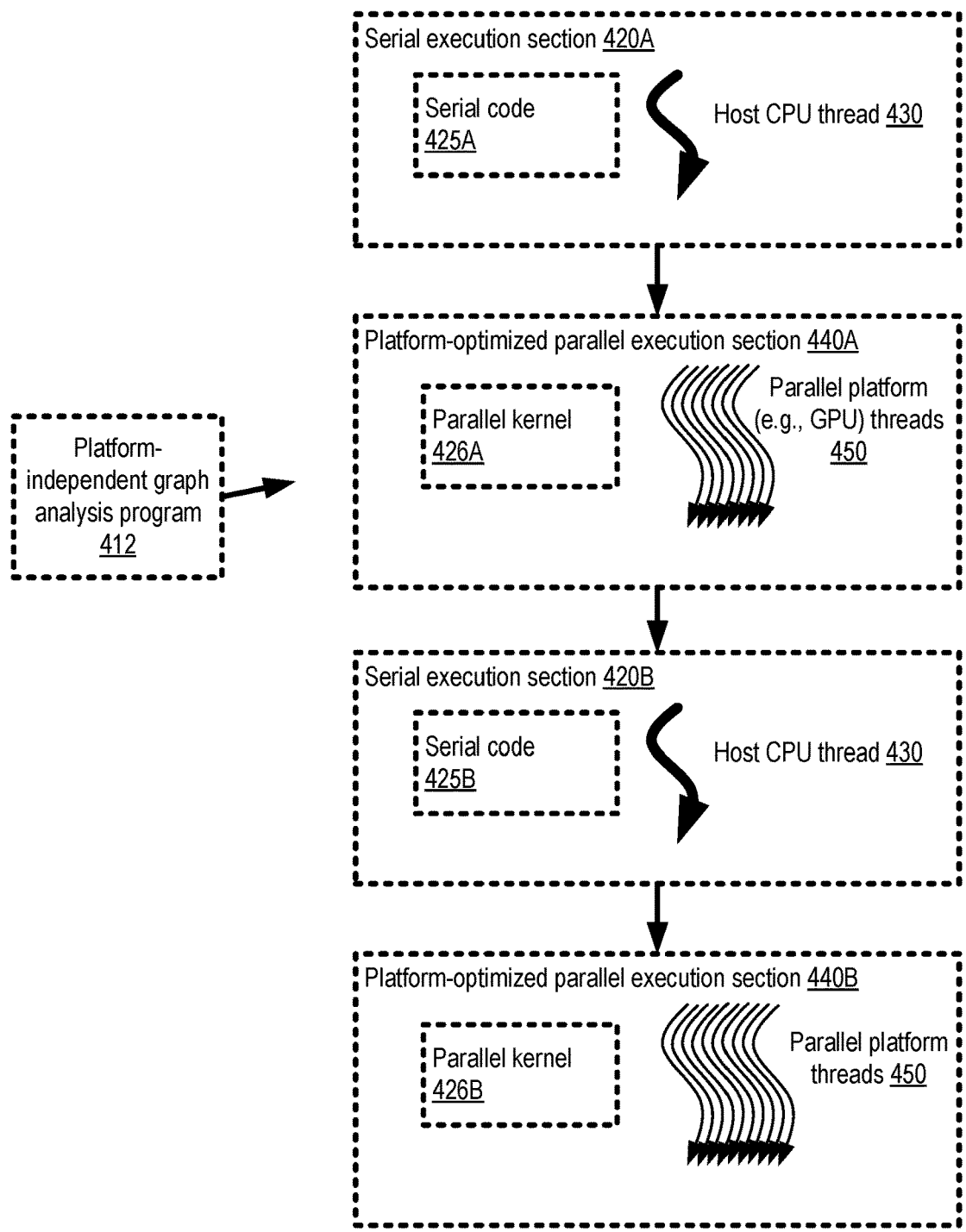
FIG. 4 illustrates an example of a sequence of serial code sections and parallel computing kernels which may be generated from a graph analysis algorithm, according to at least some embodiments.

FIG. 4 illustrates an example of a sequence of serial code sections and parallel computing kernels which may be generated from a graph analysis algorithm, according to at least some embodiments. Execution platforms comprising GPUs may be usable to execute portions of graph analysis algorithms in parallel in some embodiments, thereby speeding up overall execution time of the programs substantially (by orders of magnitude compared to fully serial execution in some embodiments). The extent of the speedup may be dependent upon the relative amount of computation that can be parallelized and the degree of parallelization achievable in each parallel phase in some embodiments. In other embodiments, other platforms may be used for parallel programming, including for example platforms comprising combinations of CPUs and GPUs, FPGAs and/or hardware (e.g., SOC) accelerators for various algorithms.

In one embodiment, using an appropriate parallel programming library, a given graph analysis program 412 may be converted by the GPAS into a sequence of sequential and parallel sections as shown. Serial code 425A and 425B of execution sections 420A and 420B may be run on a conventional host using a single CPU thread 430 in the depicted embodiment. In contrast, parallel compute kernels such as 426A and 426B of platform-specific parallel execution sections 440A and 440B may be run using parallel platform threads 450 (e.g., GPU threads) in various embodiments. In one embodiment, the GPAS may be responsible for determining the achievable parallelism possible in various parts of the code, for selecting the appropriate hardware-specific tuned compute kernels to be used based on the execution platforms available in various embodiments.

Provider Network Environment

Figure 5:
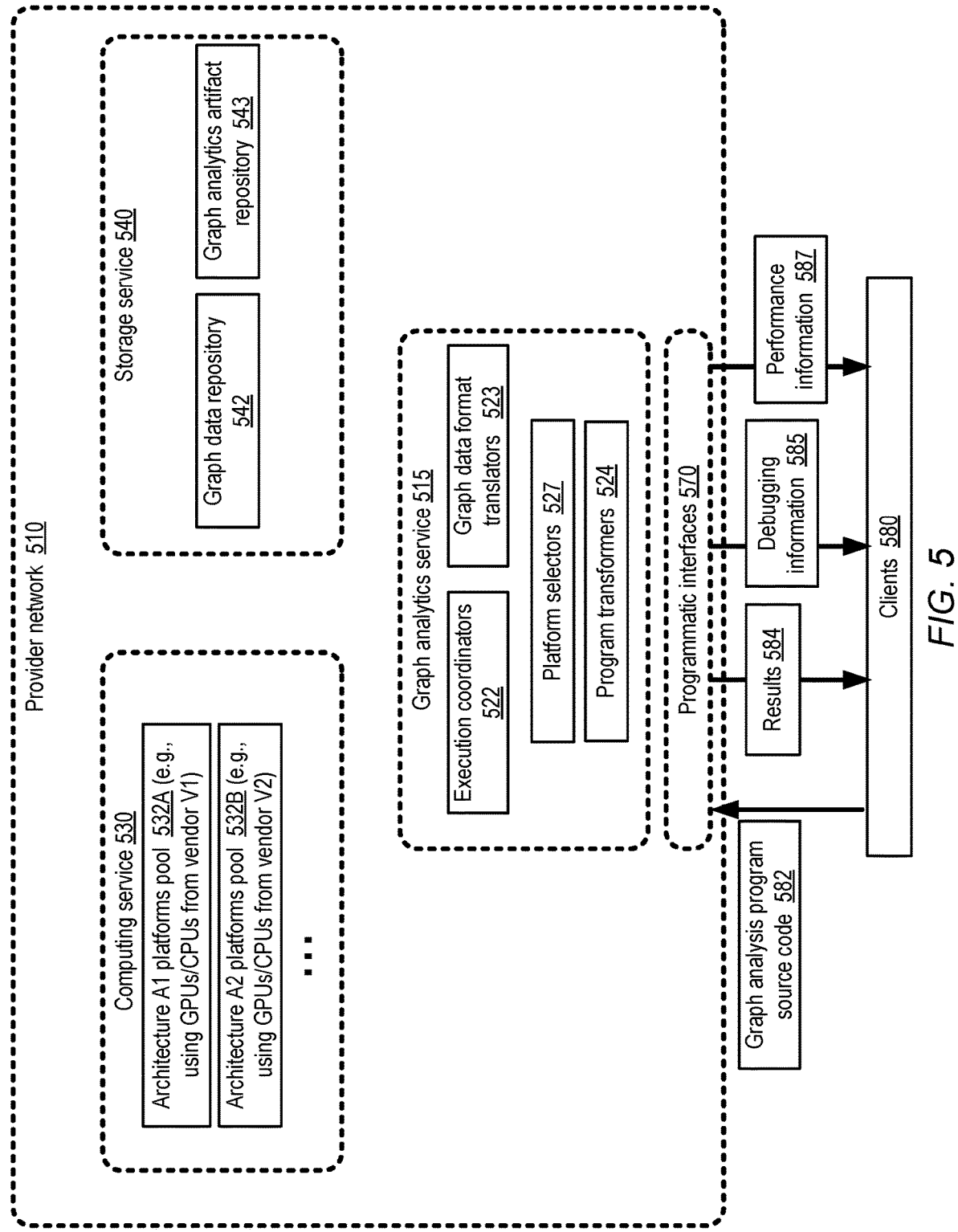
FIG. 5 illustrates an example of a provider network environment at which a graph analytics service may be implemented, according to at least some embodiments.

FIG. 5 illustrates an example of a provider network environment at which a graph analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

As shown, provider network 510 may comprise, among others, a computing service 530, a storage service 540 and a graph analytics service 515 in the depicted embodiment. The computing service 530 may comprise computing platforms representing a variety of hardware and software architectures in one embodiment. A first pool 532A of the computing service may comprise physical and/or virtual machines corresponding to one architecture A1 in the depicted embodiment, e.g., machines which comprise GPUs and/or CPUs from a first vendor V1, while a different pool 532B may comprise physical and/or virtual machines corresponding to a different architecture A2, e.g., with GPUs and/or CPUs from a different vendor V2. The programming models may differ for the different architectures in some embodiments—e.g., Architecture A1 may require compute kernels compatible with CUDA, architecture A2 may require compute kernels compatible with OpenCL (Open Computing Language), and so on. In some embodiments architectures based on FPGAs (field programmable gate arrays) and/or custom accelerators comprising SOCs may be supported. Different executable versions of graph analysis programs, each using respective compute kernels optimized or tuned specifically for the corresponding architecture, may be prepared for the various pools 532 in the depicted embodiment.

In some embodiments, a storage service 540 may be utilized to store various data sets and representations of other software objects associated with graph program preparation and execution. For example, the input graph data may be stored at graph data repository 542, and artifacts such as program source code, abstract syntax trees, task dependency graphs, platform-specific compute kernels or functions corresponding to various operators, executable versions of the programs for various platforms, program execution results, and the like may be stored in a graph analysis artifact repository 544 in the depicted embodiment. Any of a number of different types of storage services may be used in various embodiments, such as database service which implements a graph data model, a relational data model or a non-relational data model, a storage service which provides access to arbitrary storage objects using web-service interfaces, a storage service which implements storage volumes providing a block device interface, and so on. In some embodiments, the graph data itself may be stored using a different service than the artifacts. In at least one embodiment, the execution platforms used for the graph analysis programs may include (or have access to) one or more distributed parallel file systems or shared-nothing file systems.

The graph analytics service 515 may comprise several components in the depicted embodiment. Program transformers 524 may analyze the graph analysis program source code programs 582 transmitted by clients 580 via programmatic interfaces 570 and produce the abstract syntax tree representations as well as the task dependency graphs in the depicted embodiment. The platform selectors 527 may be responsible for identifying the platforms (e.g., the particular architecture A1, A2, etc.) which are to be used to execute the programs, as well as the number of platforms to be used in parallel in the depicted embodiment. In some embodiments, the selection of the platforms may be left entirely to the service 515, while in other embodiments a client 580 (e.g., an application developer or application owner) may indicate preferences regarding the platforms to be used (for example, during initial testing of the program, a developer may indicate that a single CPU-based platform will suffice for the program). In embodiments in which the service 515 selects the platforms, a number of factors may be taken into consideration, such as for example the number of available platforms in the pools 532, the extent to which the program can be parallelized, cost/billing considerations, and so on.

In one embodiment, the execution coordinators 522 may generate the platform-specific executable versions of the graph analysis program using the task dependency graphs, transmit them to the computing service 530 for execution, and obtain the results from the computing service. The results 584 may be provided to clients 580 via the programmatic interfaces 570 in one embodiment. In at least some embodiments, upon request, clients 580 may also be provided debugging information 585 such as representations of the intermediate artifacts (original or optimized dependency graphs, original or optimized abstract syntax trees, etc.). In at least one embodiment, the service may also provide performance information 587 pertaining to the execution of the program, such as the amounts of time spent in various steps of the computations, the amount of time spent in inter-node communication if a multi-node platform was used, etc. Performance information 587 may be provided by default in some embodiments, or upon request in other embodiments.

In some embodiments, graph data format translators 523 may be used at the service 515, e.g., to render input data sets into formats or data structures which are compatible with the programming environment being used. For example, a graph data set expressed in any one of the following formats or data structures may be converted to any one of the other formats or data structures in some embodiments: a Resilient Distributed Dataset (RDD) format, a Resource Description Framework (RDF) format, a data frames format (which may be supported in, for example, the R programming language or the PANDAS data analysis toolkit), a Compressed Sparse Column (CSC) data structure, or a Compressed Sparse Row (CSR) data structure.

In one embodiment, optimizations of various kinds may be identified and implemented at the graph analytics service 515 at various stages in the process of transforming and executing the graph analysis programs (e.g., by the program transformers 527 and/or the execution coordinators 522). The graph analysis programs may comprise various combinations of one or more algorithms in some embodiments, including for example tree search algorithms, hierarchical graph partitioning algorithms, graph coarsening algorithms, Louvain modularity algorithm, algorithms for determining a Jaccard similarity, triangle counting algorithms, collaborative filtering algorithms, matrix factorization algorithms, supervised neural network algorithms, clustering algorithms, or dimensionality reduction algorithms. In one embodiment, the kinds of optimizations performed at one or more components of the service may include, among others, fusing a plurality of compute kernels into a single compute kernel, unrolling of a tail recursion, a sparsity-enhancement operation, a memory allocation operation intended for an overwrite-in-place data set, a selection of a compute kernel variant based on a read-only access pattern, or storing a data set into a shared memory accessible from a plurality of execution engines (e.g., GPU cores or CPU cores) of a given execution platform. It is noted that the functions indicated for the components of the service 515 may be performed by a standalone tool or a set of tools in one embodiment; that is, a network-accessible service (or any other service of a provider network) is not a requirement for the kinds of program acceleration optimizations discussed.

Example Operators and Compute Kernels

Figure 6:
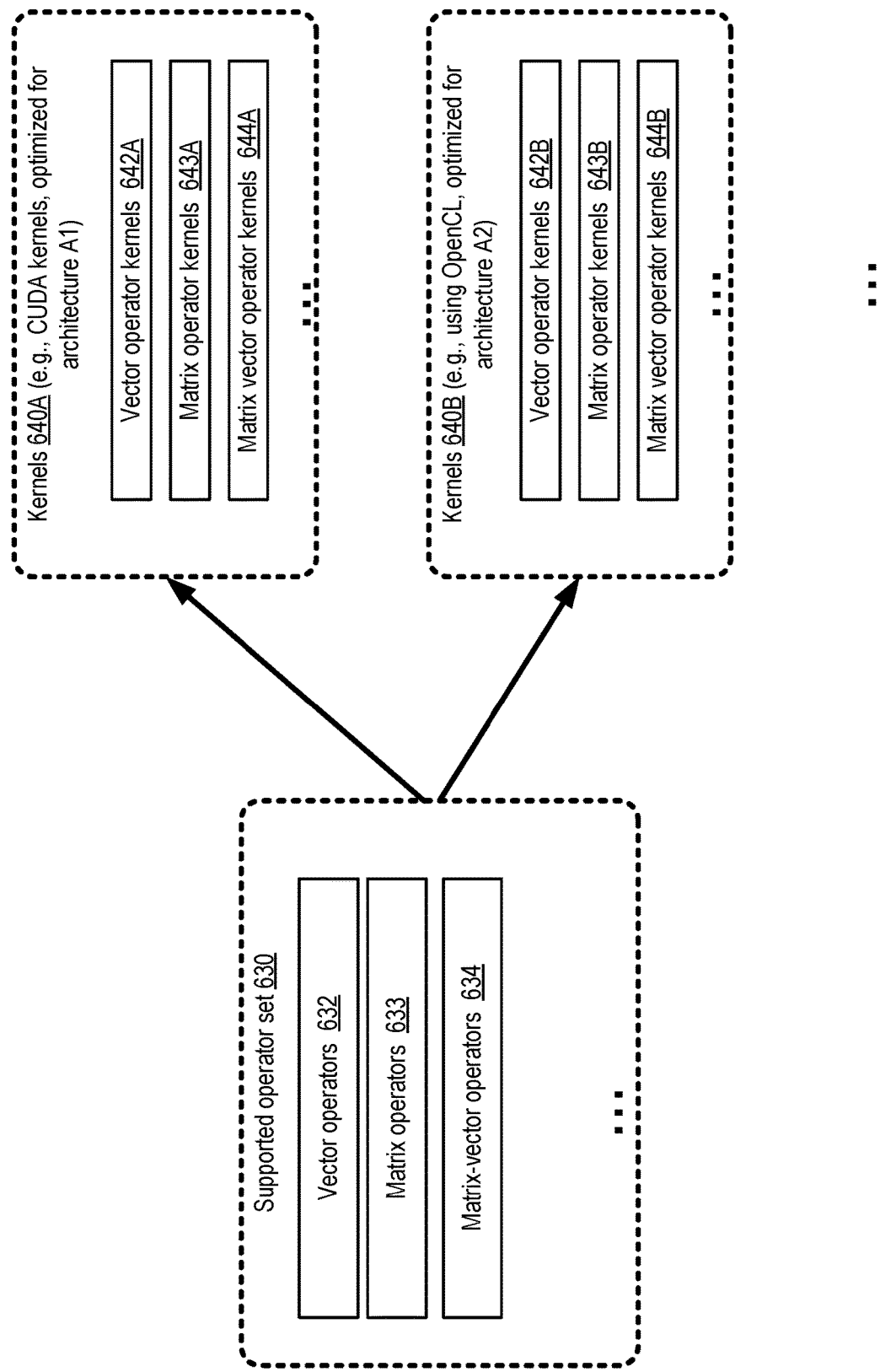
FIG. 6 illustrates examples of operators for which hardware-platform-specific kernels may be generated for graph algorithms, according to at least some embodiments.

FIG. 6 illustrates examples of operators for which hardware-platform-specific kernels may be generated for graph algorithms, according to at least some embodiments. A supported operator set 620 may include, among others, vector operators 632, matrix operators 634, and matrix-vector operators 634 in the depicted embodiment.

Vector operators 632 may include, among others, the following in one embodiment. An apply operator may produce an output vector of the same cardinality as an input vector, with each element of the output vector representing the result of applying a specified functor to the corresponding element of the input vector. A reduce operator may represent a generalization of summation that is not order-preserving. A bind operator may take argument vectors with associated names and return as output a vector of tuples with elements composed of the elements in the input vectors. An extract operator may retrieve elements corresponding to a tuple element type name from a vector of tuples. An indexSet operator may return the index set of a specified vector. A sparseView operator may return a view of an input vector containing only elements which an input index set defines as having values and which also have a value in a specified input vector. An asMatrix operator may convert a vector to a matrix.

In various embodiments, matrix operators may include, among others, the following. An SPMM (sparse matrix multiply) operator may return the result of multiplying an input matrix A with another input matrix B over a specified semi-ring. An applyMatrix operator may apply a specified functor element-wise to an input matrix and return the resulting matrix. A bindMatrix operator may return a matrix view which has elements with tuple values composed of the elements of the input matrices. A constructMatrix operator may take a sparse index and a backing relation as input and return a corresponding matrix. A sliceMatrix operator may return a submatrix extracted using specified sub-ranges of rows and columns.

Matrix-vector operations may include, among others, the following in at least one embodiment. A readFile operator may be used to generate a two-column or three-column relation from a specified input file in a specified format, with the first column indicating row indices of graph data in the file, the second column indicating column indices, and an optional third column indicating edge values. An SpMV operator may be used for multiplying an input matrix with a specified vector over a specified semi-ring. A diagonalMatrix operator may take as input a vector, and construct a matrix whose diagonal values are the non-sparse elements of the vector. In addition, one or more other types of operators may be supported in various embodiments, e.g., for pattern matching, helper functions and so on.

Corresponding to each of the operators of set 620, in one embodiment respective tuned compute kernels may be generated for each hardware/software architecture at which the graph analysis computations are expected to be performed. For example, with respect to architecture A1, CUDA-based kernels 642 may be generated—kernels 642A for vector operators, kernels 643A for matrix operators, and kernels 644A for matrix-vector operators in one embodiment. Similarly, with respect to architecture A2, OpenCL-based kernels 642B, 643B, and 644B may be created for the different types of supported operators in one embodiment. If and when support for a new execution platform architecture (e.g., a new type of GPU/CPU) is to be added to the graph program acceleration system or service, respective kernels for the various operators may be generated in various embodiments.

Methods for Accelerating Graph Analysis Programs

Figure 7:
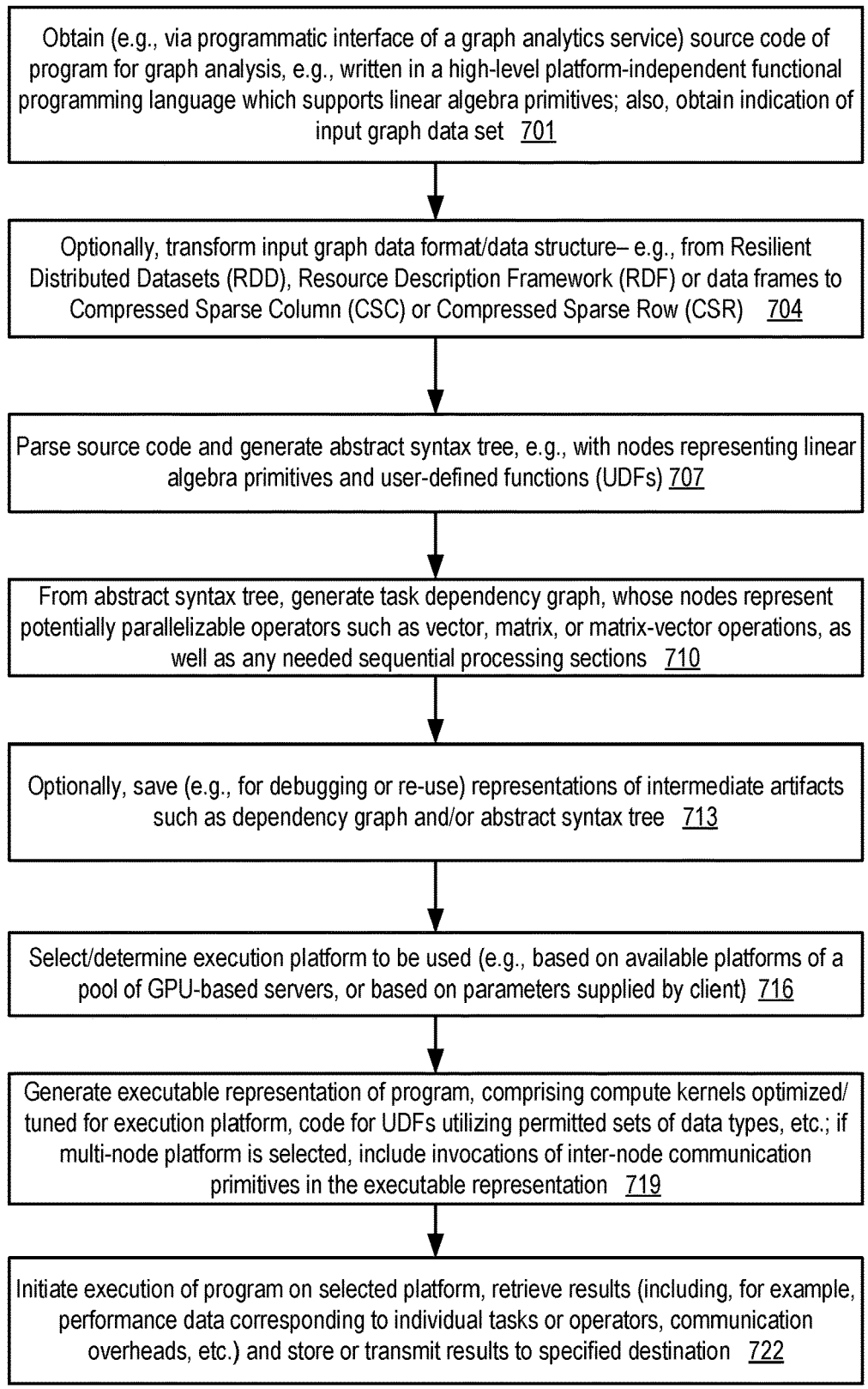
FIG. 7 is a flow diagram illustrating aspects of operations which may be performed to accelerate graph analysis algorithms expressed in a platform-independent high-level programming language, according to at least some embodiments.

FIG. 7 is a flow diagram illustrating aspects of operations which may be performed to accelerate graph analysis algorithms expressed in a platform-independent high-level programming language, according to at least some embodiments. As shown in element 701, in one embodiment source code of a graph analysis program and an indication of an input graph data set which is to be analyzed (which may be included in the source code, or supplied as a parameter of the program) may be obtained, for example, via a programmatic interface at one or more computing devices of a graph analytics service, a graph program acceleration system or tool. The source code may be expressed, for example, in a high-level platform-independent programming language in which iterative and/or other types of graph algorithms can be expressed using combinations of linear algebra primitives in one embodiment. In some embodiments, a functional programming model may be supported by the programming language; in such an embodiment, the language may restrict or prevent side effects (state changes that do not depend on function inputs) in the program.

In some embodiments, the input data set may be translated from one format or data structure to another before it can be processed (element 704). For example, in one embodiment the input graph data may be translated from Resilient Distributed Datasets (RDD), Resource Description Framework (RDF) or data frames to Compressed Sparse Column (CSC) or Compressed Sparse Row (CSR).

The source code may be parsed, and an abstract syntax tree may be generated (element 707), e.g., at a translation layer of the service or system in one embodiment. The nodes of the abstract syntax tree may comprise, for example, linear algebra primitives, user defined functions, variables, assignment operators and the like in one embodiment. In some embodiments, respective compute kernels may be generated for each user-defined function. In various embodiments, the system may search for one or more optimizations that can be performed on the original abstract syntax tree, and generate a transformed version of the abstract syntax tree which represent the results of such a first set of optimizations. Such optimizations may include, for example, rearranging some of the nodes of the tree, coalescing nodes, and so on.

From the abstract syntax tree (either the original tree or an optimized version), in one embodiment a dependency graph of tasks may be generated (element 710). In one embodiment, individual nodes or tasks of the graph may comprise potentially parallelizable operators, such as vector, matrix or matrix-vector operators; edges may represent data dependencies (e.g., when the output of one task is needed for another, an edge may connect the nodes of the two tasks). In one embodiment, some tasks may represent sequential processing steps. In some embodiments, another set of optimization opportunities may be identified with respect to the dependency graph—e.g., tasks may be divided up into parallelizable sub-tasks, tasks may be merged, and so on. A transformed version of the dependency graph may be created in one embodiment, reflecting the optimizations applied to the original task graph.

Optionally, in one embodiment, persistent representations of the artifacts produced during the analysis and optimization of the program, such as one or more abstract syntax trees and/or one or more task dependency graphs, may be stored (element 713). The abstract syntax trees and/or the task dependency graphs may be referred to as intermediary data structures herein with respect to the graph analysis program, as they are produced after the source code is written and before the program is executed. The saved representations of the artifacts or data structures may be used for debugging or addressing performance problems in various embodiments—e.g., a program developer dissatisfied with the performance achieved for a particular graph analysis program may be provided access to the task dependency graph that was generated, and so on. In some embodiments, the intermediate representations may be re-used—e.g., a given task dependency graph may be used to generate respective distinct executable code representations and run at several different hardware/software platforms if desired.

In one embodiment, a particular execution platform may be selected for the program, e.g., based on available platforms of a pool of servers, or based on parameters supplied by the program submitter or client (element 716). In one embodiment, as mentioned earlier, resources of one or more network-accessible services of a provider network, distributed parallel file systems or shared-nothing file systems may be selected as execution platforms.

At least one executable representation of the program, comprising compute kernels optimized/tuned for the selected execution platform may be generated in the depicted embodiment (element 719). The compute kernels may correspond to functions of a parallel programming library such as a CUDA library in some embodiments. If a multi-node platform is selected, in some embodiments, code for invocations of inter-node communication primitives may be inserted into the appropriate sections of the executable representation. Any appropriate communication paradigm or model may be used in different embodiments, including for example MPI, PGAS, Realm etc. Kernels corresponding to user-defined functions of the source code may be generated for one or more hardware platforms in one embodiment and incorporated into the executable representation. As mentioned earlier, in one embodiment in which graph algorithm source code is embedded within a program written in a host programming language, only a subset of data types may be used in user-defined functions and/or passed to various linear algebra primitives or operators, and compliance with such restrictions may be verified when generating the corresponding kernels.

In one embodiment, an execution of the program may be initiated on the selected platform (element 722). Results (including, for example, performance data corresponding to individual tasks or operators, communication overheads, etc.) may be retrieved from the execution platform and stored or transmitted results to specified destination in some embodiments.

Figure 8:
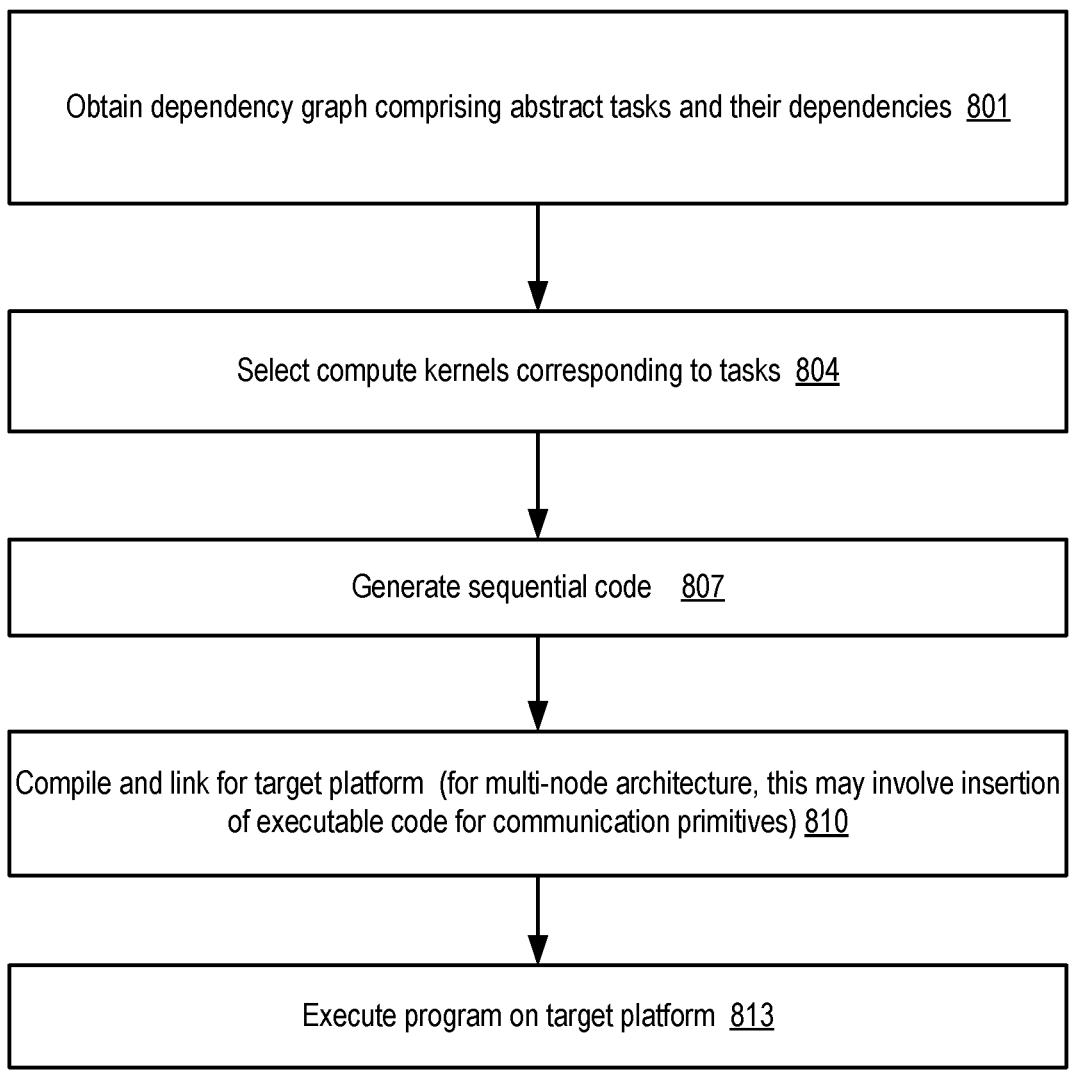
FIG. 8 is a flow diagram illustrating aspects of operations which may be performed at an execution coordinator layer of a system for accelerating graph analysis algorithms, according to at least some embodiments.

FIG. 8 is a flow diagram illustrating aspects of operations which may be performed at an execution coordinator layer of a system for accelerating graph analysis algorithms, according to at least some embodiments. As shown in element 801, in one embodiment a dependency graph whose nodes represent tasks or operators corresponding to a graph analysis program, and whose edges represent logical or data dependencies among the operators, may be obtained (e.g., as part of a communication from an execution plan generator layer of the graphic program acceleration system). Depending on the program, some of the tasks may be schedulable independently of other tasks in at least some embodiments. In one embodiment the tasks may be examined and analyzed.

In some embodiments, multiple versions of compute kernels may be available for a given task, with each version being tuned for a particular use case and/or a particular execution platform. The appropriate compute kernels corresponding to a selected execution platform may be identified in the depicted embodiment (element 804). Some of the compute kernels may correspond to the operators discussed above, while others may correspond to user-defined functions.

Sequential code, as needed, may be generated and fused into the appropriate kernels (element 807) in the depicted embodiment. The code of the program may then be compiled and linked for the targeted execution platform (element 810) in the depicted embodiment. In one embodiment, if the selected platform is a multi-node platform, code for inter-node communication may be generated in the appropriate sections of the program, compiled and linked. The program may then be executed on the target platform (element 813) in the depicted embodiment.

It is noted that in various embodiments, some of the operations shown in FIG. 7 or FIG. 8 may be implemented in a different order than that shown in the figure, or may be performed in parallel rather than sequentially. Additionally, some of the operations shown in FIG. 7 and/or FIG. 8 may not be required in one or more implementations.

Illustrative Computer System

Figure 9:
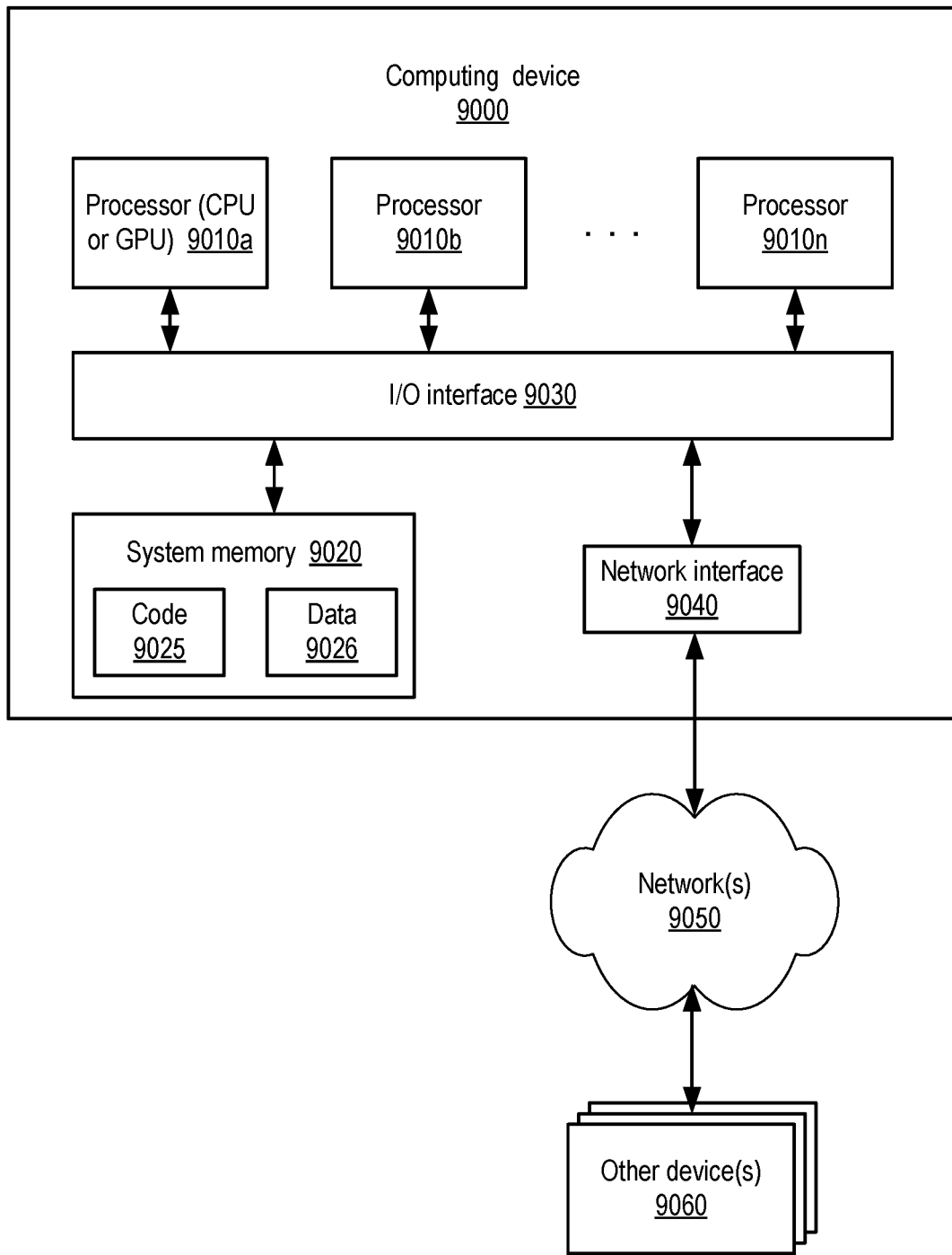
FIG. 9 is a block diagram illustrating an example computing device that may be used in at least some embodiments.

In at least some embodiments, a server that implements one or more of the techniques described above for analyzing and accelerating graph analysis algorithms and programs, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors or CPUs.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. In various embodiments, the term "computing device" may refer to one or more of these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors; and
memory storing program instructions that, if executed, cause the one or more processors to perform a method comprising:
preparing a representation of one or more task dependencies of a graph analysis program, wherein the graph analysis program comprises one or more tasks, and wherein the representation indicates that a task of the one or more tasks is a parallelizable task implemented by a compute kernel, wherein the compute kernel includes one or more executable code modules generated for an execution platform and implements a first function optimized for the execution platform that divides the parallelizable task into a plurality of sub-tasks for parallel execution using a parallel programing library of the execution platform;
generating an executable version of the graph analysis program for the execution platform, wherein the executable version includes an invocation of the first function of the compute kernel to perform the parallelizable task; and
causing the executable version of the graph analysis program to be executed on the execution platform and a result of the execution of the executable version to be stored.

2. The system as recited in 1, wherein generating the executable version comprises:
identifying one or more communication primitives to be used to enable transfer of data from a first node of a plurality of nodes of a cluster to a second node of the plurality of nodes;
including, within the executable version, respective invocations of the one or more communication primitives.

3. The system as recited in claim 1, wherein source code of the graph analysis program comprises one or more linear algebra primitive operations, and wherein in the representation of task dependencies, individual ones of the one or more linear algebra primitive operations are represented as respective nodes corresponding to respective tasks of the one or more tasks.

4. The system as recited in claim 1, wherein the parallelizable task comprises an operation to implement one or more of: (a) a sparse matrix vector multiplication primitive, (b) a sparse matrix-matrix multiplication primitive, (c) a primitive to map a unary function over a vector, (d) a primitive to map a binary function over two vectors, or (e) a primitive implementing a convolution operation.

5. The system as recited in claim 1, wherein the graph analysis program comprises one or more of: a tree search algorithm, a hierarchical graph partitioning algorithm, a graph coarsening algorithm, a Louvain modularity algorithm, an algorithm for determining a Jaccard similarity, a triangle counting algorithm, a collaborative filtering algorithm, a matrix factorization algorithm, a supervised neural network algorithm, a clustering algorithm, or a dimensionality reduction algorithm.

6. The system as recited in claim 1, wherein to obtain the result, the executable version is executed using one or more of: (a) a network-accessible computing service of a provider network, (b) a distributed parallel file system, or (c) a shared-nothing file system.

7. The system as recited in claim 1, wherein the graph analysis program comprises a user defined function, and wherein generating the executable version comprises generating another compute kernel corresponding to the user defined function.

8. A method, comprising:
preparing a representation of one or more task dependencies corresponding to a graph analysis program, wherein the graph analysis program comprises one or more tasks, and wherein the representation indicates that a task of the one or more tasks is a parallelizable task implemented by a compute kernel, wherein the compute kernel includes one or more executable code modules generated for an execution platform and implements a first function optimized for the execution platform that divides the parallelizable task into a plurality of sub-tasks for parallel execution using a parallel programing library of the execution platform;
generating an executable version of the graph analysis program for the execution platform, wherein the executable version includes an invocation of the first function of the compute kernel to perform the parallelizable task; and
causing the executable version of the graph analysis program to be executed on the execution platform and a result of the execution of the executable version to be stored.

9. The method as recited in claim 8, further comprising:
including results of one or more optimization operations in the executable code, wherein an optimization operation of the one or more optimization operations comprises one or more of: fusing a plurality of compute kernels into a single compute kernel, unrolling of a tail recursion, a sparsity-enhancement operation, a memory allocation operation intended for an overwrite-in-place data set, a selection of a compute kernel variant based on a read-only access pattern, storing a data set into a shared memory accessible from a plurality of execution engines, or combining work items dynamically into a single kernel launch based at least in part on utilization considerations.

10. The method as recited in claim 8, further comprising:
obtaining the result of the execution from one or more of: (a) a graphical processing unit (GPU), (b) a central processing unit (CPU), (c) a device comprising at least one CPU and at least one GPU, (d) a field programmable gate array (FPGA) device, or (e) an accelerator comprising a system on chip (SOC).

11. The method as recited in claim 8, wherein said generating the executable code further comprises:
identifying one or more communication primitives to be used to enable transfer of data from one node of a plurality of nodes of a cluster to another node of the plurality of nodes;
including, within the executable representation, respective invocations of the one or more communication primitives.

12. The method as recited in claim 8, wherein the graph analysis program is expressed in a functional programming language.

13. The method as recited in claim 8, further comprising:
transforming a representation of an input graph data set which is to be analyzed using the graph analysis program from a first format or data structure to a second format or data structure.

14. The method as recited in claim 8, further comprising:
obtaining an indication of the graph analysis program via a programmatic interface of a network-accessible service.

15. One or more non-transitory computer-accessible storage media storing program instructions that when executed on or across one or more processors:
obtain a representation of one or more task dependencies corresponding to a graph analysis program, wherein the graph analysis program comprises one or more tasks, and wherein the representation indicates that a task of the one or more tasks is a parallelizable task implemented by a compute kernel, wherein the compute kernel includes one or more executable code modules generated for an execution platform and implements a first function optimized for the execution platform that divides the parallelizable task into a plurality of subtasks for parallel execution using a parallel programing library of the execution platform;
generate an executable version of the graph analysis program for the execution platform, wherein the executable version includes an invocation of the first function of the compute kernel to perform the parallelizable task; and
cause the executable version of the graph analysis program to be executed on the execution platform and a result of the execution of the executable version to be stored.

16. The one or more non-transitory computer-accessible storage media as recited in claim 15, storing further program instructions that when executed on or across one or more processors:
incorporate results of one or more optimization operations into the executable version, wherein a first optimization operation of the one or more optimization operations comprises one or more of: fusing a plurality of compute kernels into a single compute kernel, unrolling of a tail recursion, a sparsity-enhancement operation, a memory allocation operation intended for an overwrite-in-place data set, a selection of a compute kernel variant based on a read-only access pattern, storing a data set into a shared memory accessible from a plurality of execution engines, or combining work items dynamically into a single kernel launch based at least in part on utilization considerations.

17. The one or more non-transitory computer-accessible storage media as recited in claim 15, storing further program instructions that when executed on or across one or more processors:
cause the execution of the executable version at one or more of: (a) a graphical processing unit (GPU), (b) a central processing unit (CPU), (c) a device comprising at least one CPU and at least one GPU, (d) a field programmable gate array (FPGA) device, or (e) an accelerator comprising a system on chip (SOC).

18. The one or more non-transitory computer-accessible storage media as recited in claim 15, storing further program instructions that when executed on or across one or more processors:
generate an abstract syntax tree based at least in part on source code of the graph analysis program; and
generate the representation of the one or more task dependencies based at least in part on the abstract syntax tree.

19. The one or more non-transitory computer-accessible storage media as recited in claim 15, wherein the one or more non-transitory computer-accessible storage media store further program instructions that when executed on or across one or more processors:
store the representation of the one or more task dependencies;
utilize the stored representation to generate another executable version of the graph analysis program that executes the parallelizable task using a second compute kernel optimized for a second of execution platform; and
cause a result of execution of the other executable version to be obtained at the second execution platform.

20. The one or more non-transitory computer-accessible storage media as recited in claim 15, storing further program instructions that when executed on or across one or more processors:
obtain a programmatic request for debugging information pertaining to the graph analysis program; and
transmit, in response to the programmatic request, at least the representation of the one or more task dependencies.

* * * * *